United States Patent
Jones et al.

[15] 3,643,245
[45] Feb. 15, 1972

[54] DISCRETE HEAT-DETECTING SYSTEM USING A THERMISTOR DETECTING ELEMENT

[72] Inventors: Roger B. Jones, North Caldwell; Raymond B. Smith, Wayne, both of N.J.

[73] Assignee: Walter Kidde & Company, Belleville, N.J.

[22] Filed: Mar. 11, 1970

[21] Appl. No.: 18,460

[52] U.S. Cl. .................... 340/228 R, 340/227 C, 340/233
[51] Int. Cl. .................................................. G08b 17/06
[58] Field of Search .............. 340/227, 227 C, 227 D, 227.1, 340/228, 233

[56] References Cited

UNITED STATES PATENTS

| | | | |
|---|---|---|---|
| 2,236,891 | 4/1941 | Bridges | 340/233 |
| 2,805,272 | 9/1957 | Postal | 340/227 C |
| 3,429,183 | 2/1969 | Lindberg | 340/228 X |
| 2,981,938 | 4/1961 | Carbauh | 340/228 |
| 2,764,659 | 9/1956 | Postal | 340/227 C |
| 2,632,885 | 3/1953 | Barclay | 340/233 |
| 2,745,089 | 5/1956 | Levy | 340/233 X |

Primary Examiner—David L. Trafton
Attorney—Harvey W. Mortimer, Morris Relson, Robert R. Keegan, Gordon D. Coplein, William F. Dudine, Jr. and Darby & Darby

[57] ABSTRACT

A heat detecting system of the type using an elongated heat-detecting element having material therein whose resistance changes in accordance with the temperature sensed by the element and an indicator which is actuated when a portion of the element is heated to a predetermined temperature causing said element to have a predetermined resistance value. The indicator is actuated by an instrument which measures the value of resistance of the material and an arrangement is provided to control the resistance value of the element at which the instrument actuates the indicator to compensate for changes in the resistance value of the element caused by the ambient environment.

9 Claims, 4 Drawing Figures

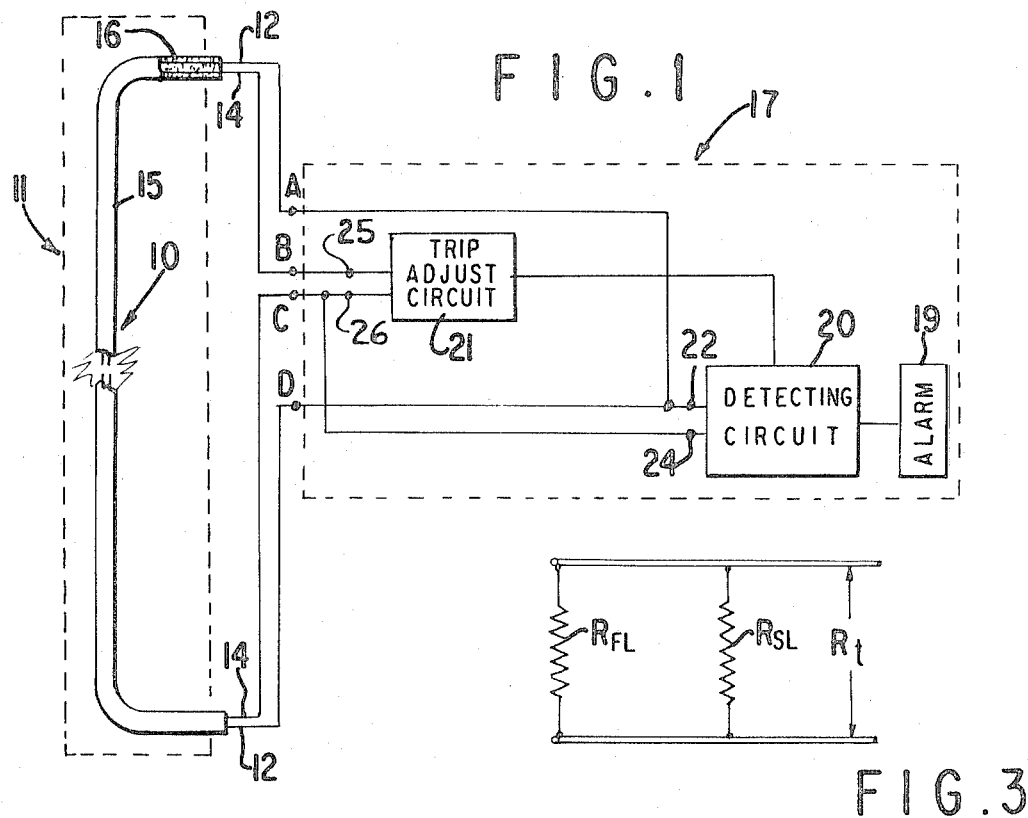
FIG. 1
FIG. 3
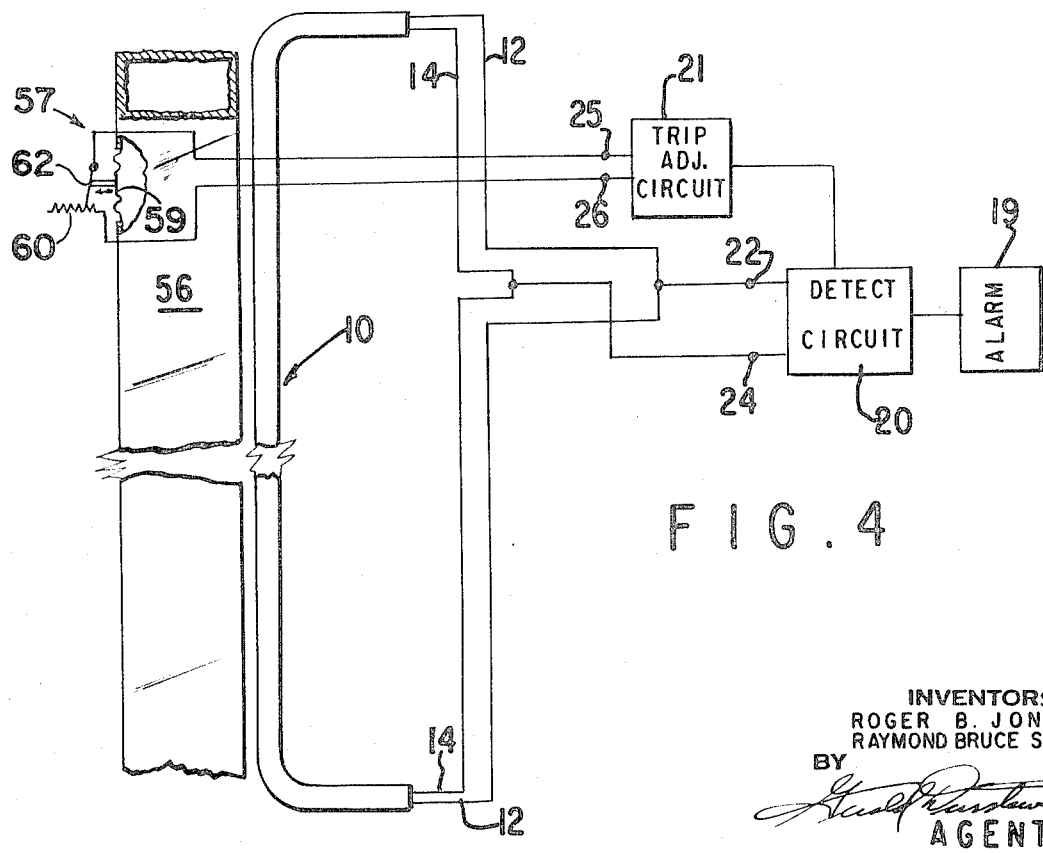
FIG. 4

INVENTORS
ROGER B. JONES
RAYMOND BRUCE SMITH
BY
AGENT

DISCRETE HEAT-DETECTING SYSTEM USING A THERMISTOR DETECTING ELEMENT

BACKGROUND OF THE INVENTION

1. Field of the Invention

The present invention relates to heat detecting systems, and, more particularly, to such systems which use an elongated detecting element including two conductors separated by a mass of thermistor material.

2. Description of the Prior Art

Many applications require a heat-detecting system which utilizes a detecting element of considerable length (for example, 100 feet) in order to monitor all of the potentially hazardous areas in a particular zone. The system monitors the resistance between the two parallel conductors which extend throughout the length of the element. The thermistor material between the conductors normally has a very high resistance at room temperature which progressively decreases as the temperature increases. Each segment of thermistor material may be considered to be connected in parallel with each other segment of the material between the two conductors. Therefore, when a portion of the element is heated, the total resistance between the conductors is a function of both the temperature to which that portion is heated and the temperature of the rest of the element.

When the entire element is heated to a specific temperature, the resistance of the element decreases to a specific value. If a short length of the element is thereafter heated to a predetermined dangerous temperature, the total resistance of the element will decrease to a second specific value. When the ambient temperature is a known constant, the system can be adjusted to respond to this second specific value and the system will accurately indicate the presence of a dangerous condition.

However, if the ambient temperature increases, the resistance of the total element assumes a lower value closer to the second specific value. Under this condition, it is not necessary to heat the short length of the element all the way up to the predetermined dangerous temperature in order to bring the total resistance of the element to the second specific resistance. The system would then give a false indication that a dangerous condition exists when the highest temperature present is actually below the dangerous temperature.

Likewise, if the system were adjusted as mentioned above and the ambient temperature decreased, a short length of the element would have to be heated to a temperature above the predetermined dangerous temperature in order to bring the total resistance of the element to the second specific value.

Therefore, in applications where the entire element is normally subjected to a high ambient temperature which varies with time, it is difficult to accurately determine when a predetermined dangerous temperature exists at any point along the length of the element. If the dangerous temperature is relatively close to the highest normal ambient temperature, it is particularly difficult to differentiate the two by measuring the resistance between the conductors of the element.

SUMMARY

Therefore, it is on object of the present invention to provide a discrete heat-detecting system utilizing an elongated thermistor element.

Another object is to provide such a system which responds when a short length is heated to a preselected temperature substantially irrespective of the temperature of the rest of the element.

Another object is to provide such a system which is simple, inexpensive, and accurate.

In accordance with the present invention the foregoing objects are accomplished by providing a system for detecting the presence of a predetermined temperature including an elongated detecting element having first and second lengthwise extending conductors with a thermistor material therebetween having a resistance that decreases with increasing temperatures, an indicator, a resistance-detecting circuit for measuring the resistance between the conductors and for operating the indicator when the resistance reaches a value indicating a predetermined element length has been heated to the predetermined temperature, and means responsive to the average temperature of the element for changing the resistance value at which the circuit operates the indicator so as to compensate for the length sensitivity of the element.

BRIEF DESCRIPTION OF THE DRAWINGS

A preferred embodiment of the invention has been chosen for purposes of illustration and description, and is shown in the accompanying drawings, forming a part of the specification, wherein:

FIG. 1 is a schematic block diagram of a system according to the present invention.

FIG. 3 is an equivalent circuit of the detecting element illustrating the condition existing when a short length and a long length of the element are heated to different temperatures.

FIG. 4 is a schematic block diagram of a modification of the system of FIG. 1.

DESCRIPTION OF THE PREFERRED EMBODIMENT

Figure 2:
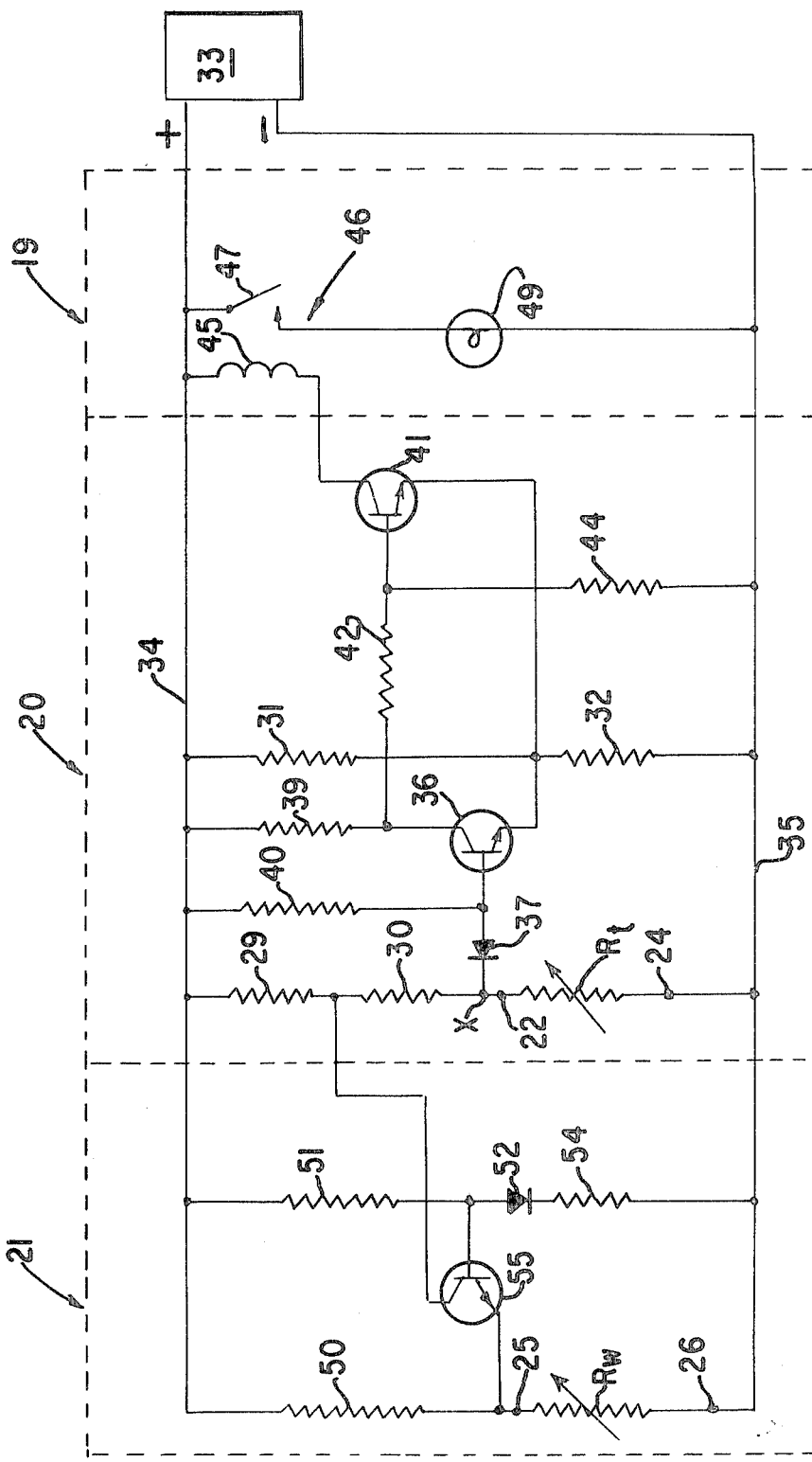
FIG. 2 is a circuit diagram of the system shown in FIG. 1.

Referring now to FIG. 1 of the drawings there is shown a system according to the present invention in which the detecting element 10 extends through a zone 11 which is subject to high ambient temperatures.

The detecting element includes a pair of parallel conductors 12 and 14 positioned within a metalic sheath 15 and surrounded by a body of thermistor material 16 having a negative temperature coefficient of resistivity.

Both ends of each of the conductors 12 and 14 are connected to a monitoring unit 17, the conductor 12 being connected between terminals A and D of the unit 17, and the conductor 14 being connected between terminals B and C of the unit.

The monitoring unit 17 includes an alarm 19, a detecting circuit 20 for measuring the resistance of the thermistor material between the conductors 12 and 14, and for operating the alarm when a predetermined resistance is sensed, and an adjusting circuit 21 for measuring the average temperature of the element 10 and adjusting the operating point of circuit 20 to compensate for the averaging effect of the element.

The detecting circuit 20 has an input terminal 22 connected to the terminals A and D and an input terminal 24 connected to the terminal C. The resistance of the thermistor material is thus connected between the terminals 22 and 24.

As described later in detail, the detecting circuit 20 is basically a bridge circuit in which the resistance of the thermistor material is one leg of the bridge. The resistance of a second leg of the bridge is adjustable and under the control of the trip adjust circuit 21.

The adjusting circuit 21 measures the average temperature of the element 10 by monitoring the resistance of the conductor 14 which is connected between the input terminals 25 and 26 of the circuit. The circuit 21 is basically a bridge circuit in which the resistance of the conductor 14 constitutes one leg of the bridge.

Referring now to FIG. 2 in detail, the detecting circuit 20 includes a resistance bridge in which a pair of series connected resistors 29 and 30 form a first leg, the resistance of the thermistor material, shown as $R_t$, constitutes the second leg, a resistor 31 forms the third leg, and a resistor 32 forms the fourth leg. The resistor 29 and 31 are connected to the positive terminal of a DC source 33 through a conductor 34, and the resistor 32 and the thermistor resistance $R_t$ are connected to the negative terminal of the source 33 through a conductor 35. The balance condition of the bridge is detected by a transistor 36 which has its base connected to the junction point $x$ of the register 30 and the resistance $R_t$ through a diode 37, and has its emitter connected directly to the junction of the resistors 31 and 32. The collector of transistor 36 is connected to the conductor 34 through a resistor 39, and a resistor 40 is connected between the conductor 34 and the base of the transistor 36.

The transistor 36 is normally conducting and a second transistor 41 which is normally nonconducting is connected to the output of the transistor 36 to form an alarm trigger circuit. A pair of resistors 42 and 44 are connected in series between the collector of transistor 36 and the conductor 35, and the base of the transistor 41 is connected to the junction of these resistors. The transistor 41 has its emitter directly connected to the emitter of transistor 36 and its collector is connected to the conductor 34 through the coil 45 of an alarm relay 46. The alarm relay 46 has contacts 47 which are connected in series with a lamp 49 between the conductors 34 and 35.

The adjusting circuit 21 includes a resistance bridge in which a resistor 50 is a first leg, the resistance of the wire 14 shown as $R_w$ is a second leg, a resistor 51 is a third leg, and a diode 52 and a resistor 54 connected in series constitutes the fourth leg. The bridge is connected between the conductors 34 and 35, and a transistor 55 is connected across the output of the bridge to sense the condition of balance. The transistor 55 has its base connected to the junction of resistor 51 and the diode 52 and has its emitter connected to the junction of resistor 50 and the resistance $R_w$. The collector of the transistor 55 is connected to the junction of the resistors 29 and 30 in the detecting circuit 20.

In operation, when the sensing element is at room temperature its total resistance between the conductors 12 and 14 is very high (60,000 to 500,000 ohms depending on the composition of the thermistor material) and substantially all of the source voltage is dropped across the thermistor resistance $R_t$. The junction point $x$ of $R_t$ and resistor 30 therefore has a high positive potential and current flows from the conductor 34 through the resistor 40, the base emitter circuit of the transistor 36, and the resistor 32 to the negative conductor 35. The point $x$ is more positive than the base of the transistor 36 therefore all the current flowing through the resistor 40 flows through the base emitter circuit of the transistor 36 and the transistor is in full conduction. The collector of the transistor 36 has a low positive potential, and the voltage-dividing action of the resistors 42 and 44 reduces the potential applied to the base of the transistor 41 to a value which is less positive than the potential present at the emitters of the transistors. Transistor 41 is thus held in a cutoff condition and no current flows through the winding 45 of the alarm relay 46 and the contacts 47 remain open.

Neglecting for the moment the operation of the adjusting circuit 21, when the sensing element is heated its total resistance $R_t$ decreases and the point $x$ decreases in potential. When the point $x$ becomes less positive than the base of the transistor 36, some of the current flowing through the resistor 40 is diverted from the base emitter circuit of the transistor 36 and flows through the resistance $R_t$. As a result the collector current of the transistor 36 decreases and the potential of the base of the transistor 41 increases. When the resistance $R_t$ reaches a predetermined value, sufficient current is diverted from the base of the transistor 36 to cause the collector current to drop to a point which places the base of transistor 41 at a more positive potential than the emitter thereof. The transistor 41 goes into conduction and the transistor 36 is driven into cutoff by the increase in emitter potential resulting from the increased current flow through the common resistor 32. The relay 46 is thus energized and the alarm lamp 49 is illuminated.

In the absence of the adjusting circuit 21, there is no way of distinguishing whether the predetermined value of $R_t$ resulted from heating a short length of element to a predetermined high temperature or from heating the short length to a lower temperature while the entire element is experiencing a high ambient temperature.

FIG. 3 shows the equivalent circuit for the element shown in FIG. 1 wherein RSL is the resistance of a heated predetermined short length of the element and RFL is the resistance of the rest of the element. As an example, if a system which is designed to produce an indication when 6 inches of the element is heated to a predetermined temperature and which uses a 100-foot element, RSL is the resistance of the heated 6 inches of element and RFL is the resistance of 99.5 feet of element at the ambient temperature in the zone.

It can be seen that the total resistance $R_t$ is effected by a change in either of these resistances. The heating of 6 inches of element to the predetermined temperature produces a specific value of RSL, however, the $R_t$ value which results is greatly dependent upon the effect which the ambient temperature has on RFL. For example, with a particular 100-foot element RSL has a value of 20,000 ohms when 6 inches is heated to 250° F. and RFL has a value which varies from 400,000 ohms to 180 ohms as the ambient temperature varies from −65° to 200°F. When 6 inches of the element is at 250° F., an ambient temperature of −65° F. produces a total element resistance $R_t$ of 12,000 ohms while an ambient of 200° F. produces a resistance $R_t$ of 177 ohms. Therefore, a system employing this element which is intended to give an indication only when at least 6 inches of the element is heated to at least 250° F. must respond to different values of $R_t$ at different ambient temperatures.

The adjusting circuit 21 makes the system discrete by measuring the average temperature of the element and adjusting the operating point of the detecting circuit accordingly so that the detecting circuit operates the alarm only when the short length of the element is heated to the predetermined temperature irrespective of the ambient temperature.

The resistors 50, 51 and 54 of the resistance bridge in the trip adjusting circuit 21 are chosen so that the transistor 55 conducts heavily at room temperatures and moves toward cutoff as the resistance $R_w$ of the conductor 14 increases in response to heating of the element. The increase in $R_w$ moves the potential of the emitter of transistor 55 toward the potential of the base thereof and thus reduces the collector current drawn by the transistor. Since the collector current for the transistor 55 is supplied through the resistor 29 of the resistance bridge of the detecting circuit 20, the rate of conduction of the transistor 55 effects the potential at the point $x$ by varying the voltage drop across the resistor 29.

The value of the resistance $R_t$ which will cause the detecting circuit 20 to actuate the alarm 19 changes as the potential at the point $x$ changes.

The circuit components of the detecting circuit 20 are chosen such that an alarm is given when the ambient temperature in the zone is at the low end of its range and a predetermined short length of the element is heated to the particular temperature to which the system is intended to respond. When the ambient temperature of the element increases, the resistance $R_w$ increases causing the transistor 55 to conduct less so that the voltage drop across the resistor 29 decreases tending to make the point $x$ more positive. The detecting circuit is thus adjusted so that an alarm will not be produced until the total resistance $R_t$ of the element decreases to the lower value which results from the short length being heated to the predetermined temperature while the rest of the element is at the higher ambient temperature. By thus adjusting the operating point of the detecting circuit 20, the circuit 21 insures that an alarm will be given only in response to the heating of at least a short length of the element to at least a predetermined temperature.

In certain applications, as described hereinafter, detectable parameters other than the resistance of an element conductor can be used to determine whether the entire element length or a short element length is being heated.

FIG. 4 shows a modification of the system of FIG. 1 wherein the detecting element 10 is positioned along a hot air duct 56 to detect a leak in the duct by responding to an increase in element temperature above the normal ambient range. The temperature of the air flowing through the duct 56 varies with time. The hot air in the duct heats the duct wall to a temperature which is significantly less than the temperature of the hot air. The entire length of the element is thereby heated to a nondangerous ambient temperature which varies with time.

When a leak develops in the duct, the escaping hot air further heats a section of the element, either by direct impingement or by raising the environmental temperature. If the escaping hot air is at a temperature which is dangerous to the environment surrounding the duct, an alarm must be given.

A low element resistance can result from either the heating of the entire element to a high ambient temperature or the heating of a short length to a dangerous temperature.

The pressure within the duct varies in proportion to the hot air temperature, therefore, this pressure can be used in determining whether a low element resistance is due to the heating of the entire element.

A transducer 57 is mounted in one wall of the duct 56 to sense the pressure within the duct and translate changes in pressure into changes in electrical resistance. The transducer 57 includes a diaphragm 59 and a rheostat 60 having a resistance element 61 provided with a sliding contact 62. The sliding contact 62 is physically connected to the diaphragm 59 to be moved along the resistance element 61 as the diaphragm responds to pressure changes.

In this embodiment, the input terminal 25 and 26 of the adjusting circuit 21 are connected to the rheostat 60 instead of to the ends of the conductor 14 as shown in FIG. 1. In all other respects, the element 10, the alarm 19, the detecting circuit 20, and the adjusting circuit 21 are essentially the same in construction, operation and interconnection as shown and described in connection with FIGS. 1 and 2.

In the operation of this embodiment, when the hot air in the duct 56 increases in temperature, the pressure in the duct also increases and the diaphragm moves the slide 62 so as to increase the resistance of the rheostat 60. The adjusting circuit 21 responds to this resistance change and adjusts the detecting circuit so that a lower element resistance is required to initiate an alarm, thus insuring that an alarm will be given only if the element experiences a predetermined dangerous temperature.

When a leak occurs in the duct, the temperature of the element increases without any increase in the pressure within the duct. The operating point of the detecting circuit 20 is therefore unchanged and an alarm is given if a section of the element reaches the dangerous temperature.

It will be seen from the foregoing that the present invention provides a simple, inexpensive, and accurate discrete heat-detecting system in which an elongated thermistor element is used and which responds to a preselected temperature substantially irrespective of the length of element heated.

We claim:

1. A system for detecting the presence of a predetermined temperature within a zone which experiences an ambient temperature that varies with time comprising an elongated detecting element positioned within the zone for sensing the temperature within the zone, said element having first and second conductors extending lengthwise thereof and a material between said conductors having a resistance which changes with varying temperatures, an indicator, first means connected to said element and to said indicator for measuring the resistance of the material between said conductors and for operating said indicator when the resistance of the material between said conductors reaches an operating value indicating a length of said element less than its overall length has been heated to said predetermined temperature, and control means responsive to the average temperature sensed by the element for changing the operating resistance value of said first resistance measuring means to compensate for changes in the element resistance due to the effect of the ambient temperature within the zone.

2. Apparatus according to claim 1 wherein said control means includes second resistance-measuring means connected to one of said element conductors for measuring the resistance of said conductor and for adjusting the operating resistance value of said first measuring means in accordance with the resistance of said conductor.

3. Apparatus according to claim 2 wherein said second resistance-measuring means is connected across a substantial portion of the length of said conductor to measure the resistance of said conductor, said second resistance-measuring means operating to decrease the operating resistance value of said first measuring means in response to an increase in the resistance of said conductor.

4. Apparatus according to claim 3 wherein said first measuring means includes first and second resistors connected in series with said resistance material of said element across a voltage source, and means connected to the junction of said second resistor and said resistance material of said element to actuate said indicator when said junction reaches a predetermined potential, and wherein said second measuring means includes a third resistor connected in series with said conductor across said voltage source and means connected to the junction of said third resistance and said conductor to vary the current flow through said first resistor in response to changes in the resistance of said conductor so as to change the potential at the junction of said second resistor and said thermistor resistance.

5. Apparatus according to claim 1 wherein said element is positioned to monitor a zone having a pressure which is a function of ambient temperature, and wherein said control means responds to the ambient temperature within said zone by detecting pressure changes.

6. Apparatus as in claim 1 wherein said resistance material between the conductors has a negative temperature coefficient of resistance.

7. Apparatus as in claim 2 wherein said resistance material between the conductors has a negative temperature coefficient of resistance and said one conductor connected to said second resistance-measuring means has a positive temperature coefficient of resistance.

8. A system for detecting leaks in a conduit which carries heated air comprising: an elongated detecting element having first and second conductors extending lengthwise thereof and material between said conductors having a resistance whose value changes with varying temperature, said element being in proximity to said conduit to sense the temperature of said conduit, indicator means, first means connected to said element and to said indicator means for measuring the resistance of the material between said conductors and for operating said indicator means when the resistance of the material between said conductors reaches an operating value indicating that a length less than the entire length of said element has been heated to said predetermined temperature, and control means responsive to the pressure in said conduit for changing the operating resistance value of said first resistance-measuring means in response to a change in the pressure in said conduit which is caused by a change in the temperature of the air carried in the conduit and sensed by said element to compensate for changes in the element resistance due to the effect of temperature changes of the air within the conduit.

9. A system as in claim 8 wherein said control means comprises pressure-sensitive means having a portion thereof communicating with the interior of said conduit, and variable resistance means actuated by said pressure sensitive means.

* * * * *